(12) United States Patent
Miyaji et al.

(10) Patent No.: US 10,500,528 B2
(45) Date of Patent: Dec. 10, 2019

(54) CLOGGING ESTIMATION METHOD AND FILTER MONITORING SYSTEM

(71) Applicant: Think-Lands Co., Ltd., Yokohama, Kanagawa (JP)

(72) Inventors: Kunio Miyaji, Yokohama (JP); Kenji Furuki, Yokohama (JP); Hitoshi Era, Yokohama (JP); Kei Mori, Yokohama (JP); Kazuo Kawaguchi, Chino (JP); Hidetsugu Yamaguchi, Chiyoda-ku Tokyo (JP)

(73) Assignee: Think-Lands Co., Ltd., Yokohama (JP)

( * ) Notice: Subject to any disclaimer, the term of this patent is extended or adjusted under 35 U.S.C. 154(b) by 204 days.

(21) Appl. No.: 15/523,344

(22) PCT Filed: Oct. 13, 2015

(86) PCT No.: PCT/JP2015/078918
§ 371 (c)(1),
(2) Date: Apr. 28, 2017

(87) PCT Pub. No.: WO2016/067909
PCT Pub. Date: May 6, 2016

(65) Prior Publication Data
US 2017/0246565 A1   Aug. 31, 2017

(30) Foreign Application Priority Data
Oct. 30, 2014   (JP) .................................. 2014-221180

(51) Int. Cl.
*B01D 35/143* (2006.01)
(52) U.S. Cl.
CPC ........ *B01D 35/143* (2013.01); *B01D 2201/56* (2013.01)

(58) Field of Classification Search
CPC .......................... B01D 35/143; B01D 2201/56
(Continued)

(56) References Cited

U.S. PATENT DOCUMENTS

2006/0100796 A1* 5/2006 Fraden ..................... A47L 9/19
702/45
2006/0265106 A1* 11/2006 Giles .................... A01B 79/005
700/283
(Continued)

FOREIGN PATENT DOCUMENTS

JP   H05-223312 A   8/1993
JP   H08-001282 U   8/1996
(Continued)

OTHER PUBLICATIONS

International Search Report and Written Opinion mailed by Japan Patent Office dated Feb. 9, 2014 in the corresponding PCT Application No. PCT/JP2015/078918.

*Primary Examiner* — Jacques M Saint Surin
(74) *Attorney, Agent, or Firm* — Knobbe, Martens, Olson & Bear, LLP

(57) ABSTRACT

The ability to estimate a filter clog by a means other than measuring fluid pressure is presented. The filter monitoring system of the present disclosure comprises a vibration data transmission unit, which is mounted on a filtration device, detecting filter vibrations associated with the operation of filtration device described above, sending such as vibration data, and a clog estimation unit, which detects the phenomenon of declining vibration value caused by a filter clog, estimating the degree of blockage for the filter described above.

27 Claims, 10 Drawing Sheets

(58) Field of Classification Search
USPC .......................................................... 73/649
See application file for complete search history.

(56) References Cited

U.S. PATENT DOCUMENTS

| | | | | |
|---|---|---|---|---|
| 2010/0043643 | A1* | 2/2010 | Cheng | B01D 46/0023 96/418 |
| 2013/0081983 | A1* | 4/2013 | Conley | F16N 39/06 210/90 |
| 2015/0254958 | A1* | 9/2015 | Sherman | G08B 21/18 340/607 |
| 2016/0167364 | A1* | 6/2016 | Matsumoto | B41J 2/04576 347/9 |
| 2017/0314357 | A1* | 11/2017 | Kent | E21B 33/0355 |
| 2018/0229173 | A1* | 8/2018 | Weinbrenner | B01D 46/0086 |

FOREIGN PATENT DOCUMENTS

| | | |
|---|---|---|
| JP | H10-087233 A | 4/1998 |
| JP | 2002-323355 A | 11/2002 |
| JP | 2010-017378 A | 1/2010 |
| JP | 2010-091230 A | 4/2010 |
| JP | 2012-110862 A | 6/2012 |
| JP | 2014-222150 A | 11/2014 |

* cited by examiner

CLOGGING ESTIMATION METHOD AND FILTER MONITORING SYSTEM

TECHNICAL FIELD OF THE INVENTION

The described technology is suitable, for example, for application in filtration devices used in the filtration of liquids.

BACKGROUND

Traditionally, filters are used to remove foreign bodies and impurities (hereinafter, "removed materials") from fluids when fluids such as water or oil are used for various purposes with respect to drinking water such as juices or mineral water, or with respect to commercial applications. In the event of a clog arising from accumulated removed materials, the fluid is not able to pass through the filter, and accordingly, a filter replacement must be performed.

Accordingly, filter clog warning devices that measure fluid pressure and notify the timing of filter replacement are known to exist (for example, cross reference Patent Document 1).

PRIOR ART DOCUMENTS

Patent Documents

[Patent Document 1]
Japanese Examined Utility Model (Registration) Application Publication No. H8-1282

SUMMARY

Problem to be Solved by the Described Technology

The aforementioned composition of these clog warning devices notify the timing of filter replacement; however, preparing a filter after the requirement for filter replacement has had the problem of extending the time required for replacing the filter.

The described technology has been made to solve this problem, and the objective of described technology is to provide a filter monitoring system capable of estimating the time of preparation for filter replacement.

Means for Solving the Problem

To resolve the aforementioned issues, the filter monitoring system of the described technology is mounted to a filtration device, the filter monitoring system comprised of a vibration data transmission unit that detects vibrations of the filter accompanying the operation of the filtration device mentioned above and sends this as vibration data and a clog estimation unit that estimates the degree of blockage of the aforementioned filter through the detection of reduced vibration values due to filter clogging.

Through this mechanism, the filter monitoring system is able to estimate the timing in which filter replacement should be prepared.

The feature of the clog estimation method of the described technology is the detection of the phenomenon of a reduction in vibration value due to a filter clog, through which it estimates the degree of blockage of the filter as described above.

Through this, the clog estimation method is able to estimate the timing in which the filter replacement should be prepared.

Effects

The described technology is a filter monitoring system and clog estimation method capable of estimating the timing in which a filter replacement should be prepared.

DESCRIPTION OF THE EMBODIMENTS

The following references figures to explain the description of the embodiments of the present invention.

In general, it is widely known that a clog occurring in a filter disrupts the flow of fluids inside the filter, and, accordingly, fluid pressure rises in the area immediately in front of the filter. Because of this, a consecutive series of checks are performed to confirm the presence of filter clogs at the operation site. Accordingly, a new method capable of estimating the degree of blockage of a filter has been eagerly anticipated. Accordingly, the inventor of the present invention focused attention on the vibrations in the filter device.

Figure 1:
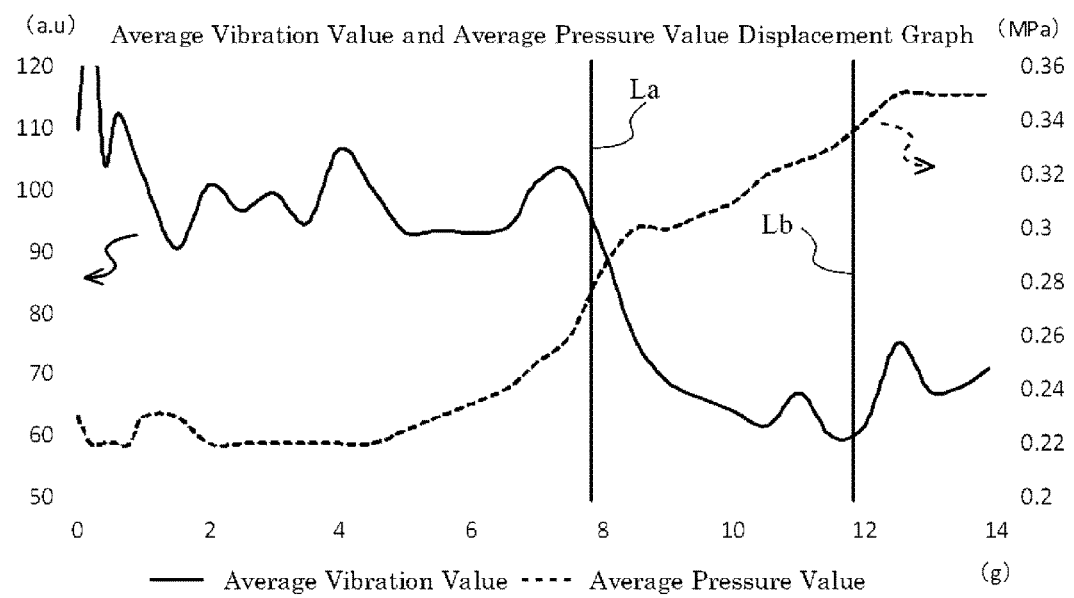
FIG. 1 This is a graph explaining the relationship between vibration and pressure.

FIG. 1 is a graph comparing the average vibration value and average water pressure value of a filtration device filtering water. The solid line represents the average vibration value, and the dashed line represents the average water pressure value. As understood by this graph, average water pressure values increase due to filter clogs, while average vibration value decreases. Further, the horizontal axis indicates the volume of foreign bodies introduced artificially.

Accordingly, the inventor of the present invention used the vibrations of the filtration device to invent a clog estimation method to estimate the degree of blockage in a filter, a filter monitoring system, and a vibration data transmission unit used by these devices.

Further, while traditional warning devices as described above do notify of the timing to replace a filter, preparing a filter after the requirement for filter replacement has led to the problem of extending the time required for replacing a filter.

As understood from FIG. 1, average water pressure increases, and a fixed length of time is required from line La in the vicinity of 8 g where the average vibration value falls to line Lb in the vicinity of 12 g where the average water pressure is at nearly maximum for a filter with a clog.

Accordingly, the inventor of the present invention has used this phenomenon to provide a notification advising the worker that filter replacement timing is near at hand prior to the filter becoming clogged.

<First Embodiment>

[1-1. Configuration of the Filter Monitoring System]

Figure 2:
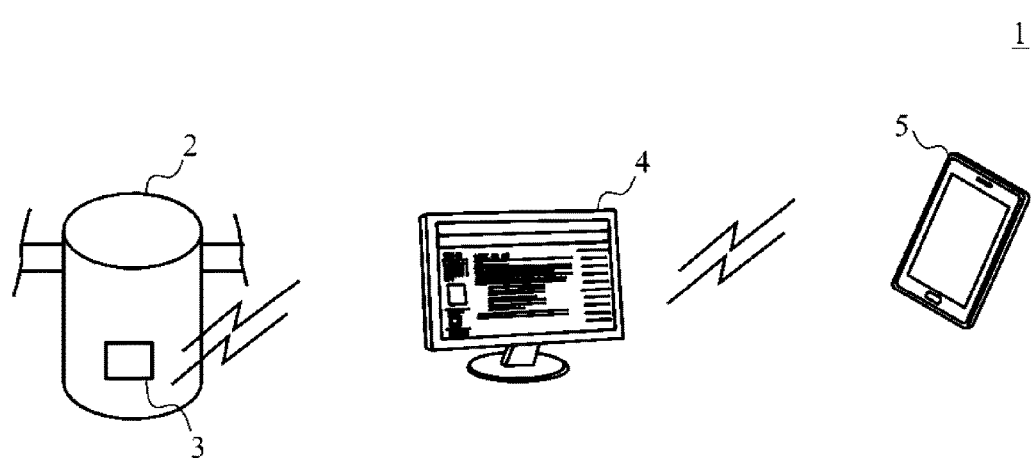
FIG. 2 This is a schematic diagram representing the configuration of the filter monitoring system.

Part 1 of FIG. 2 represents the filter monitoring system overview. The filter monitoring system 1 includes a vibration data transmission unit 3 mounted on a filtration device 2, clog estimation unit 4, and operator terminal device 5.

Figure 3:
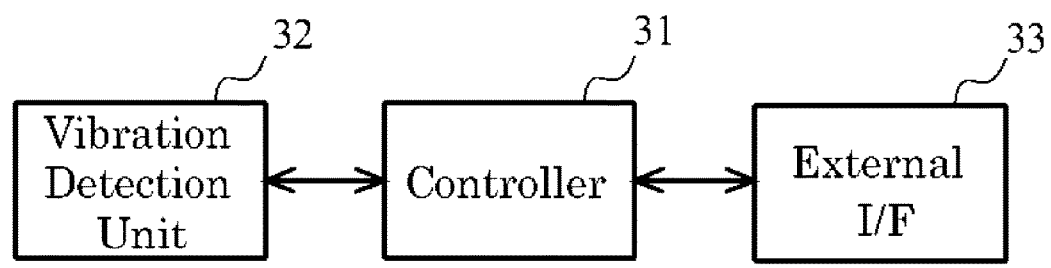
FIG. 3 This is a schematic diagram representing the configuration of the vibration data transmission unit.

As shown in FIG. 3, a controller 31, comprised of an MPU (Micro Processing Unit), ROM (Read Only Memory), and RAM (Random Access Memory) not illustrated, provides integrated control of the vibration data transmission unit 3 overall.

Filtration device 2 is installed with a filter made from ceramic for example, inside a cylindrical housing having piping 21 and 22 moving in the y-axis forward and back.

Vibration detection unit 32 has, for example, a gyro sensor and acceleration sensor allowing for measurement of angular velocity and acceleration. The gyro sensor uses an axis detection type gyro sensor to detect 1 angular velocity in the z-axis (FIG. 3).

Further, the configuration of filtration device 2 may use a variety of shapes and materials without restriction, including cylindrical or rectangular parallelepiped. Also, the filter may use materials other than ceramic without restriction, including paper, plastic, or other well-known materials.

Figure 4:
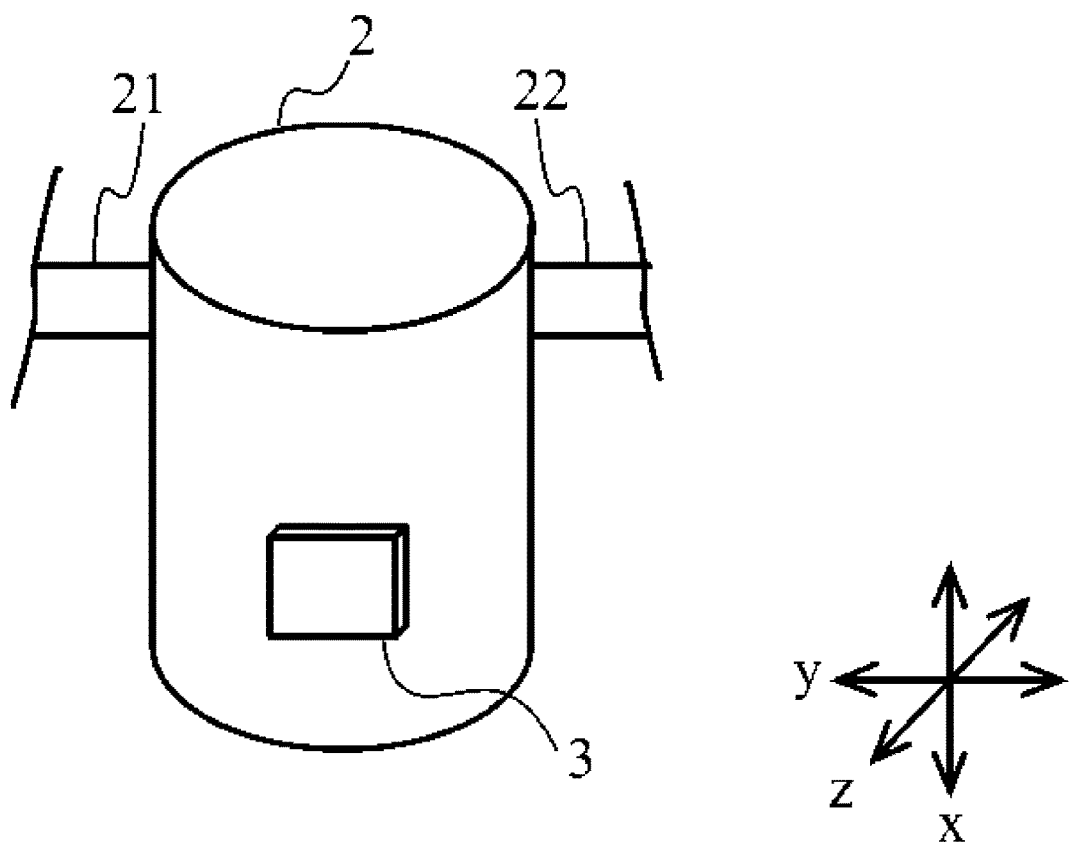
FIG. 4 This is a schematic diagram submitted to explain the installation of the vibration data transmission unit.

As shown in FIG. 4, vibration data transmission unit 3 has been mounted on the exterior of filtration device 2. The installation method may be magnetic, double-sided tape, metal fittings for mounting, or other appropriate installation method without restriction.

External interface 33 has a function to communicate externally, using, for example, wireless LAN, Bluetooth (registered trademark), or other types of communication methods to communicate externally via wireless, wired, or a combination thereof.

Figure 5:
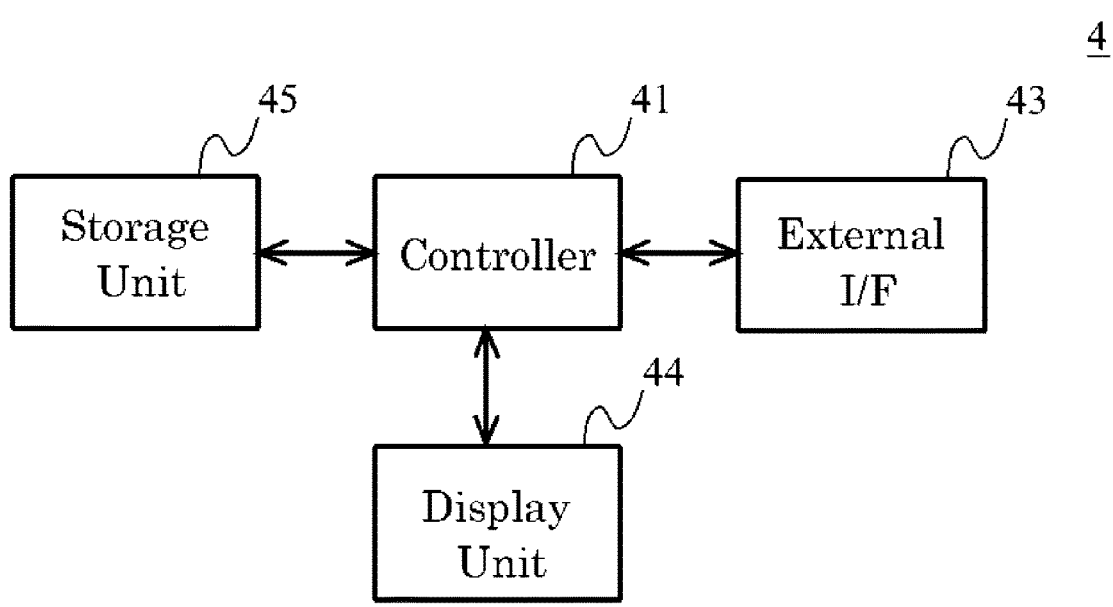
FIG. 5 This is a schematic diagram representing the configuration of the clog estimation unit.

As show in FIG. 5, a controller 41, comprised of CPU (Central Processing Unit), ROM (Read Only Memory), and RAM (Random Access Memory), provides integrated control of the clog estimation unit 4 overall, executing clog estimation processing as described below. A computer of various types, including, for example, personal computers, smartphones, or tablet terminals, may be used for the clog estimation unit 4. Clog estimation unit 4 is placed, for example, in a factory control room in which a filtration device 2 has been installed.

Figure 6:
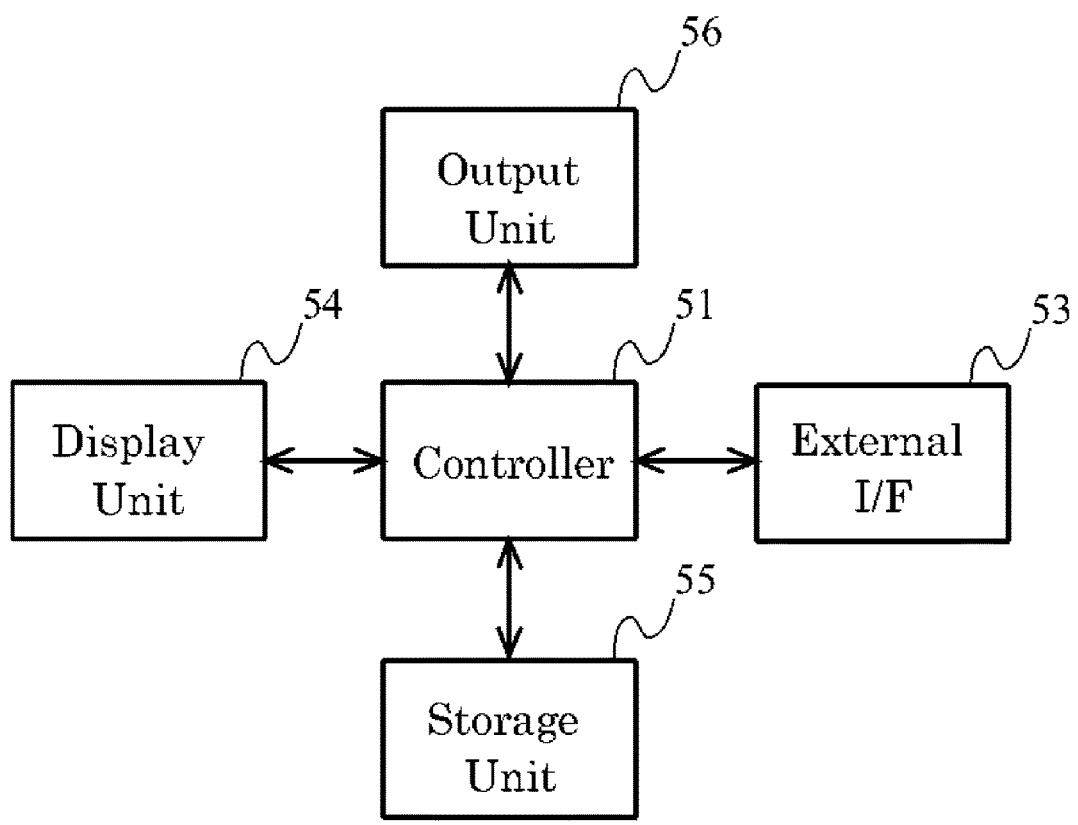
FIG. 6 This is a schematic diagram representing the configuration of the operator terminal device.

As shown in FIG. 6, a controller 51, comprised of CPU (Central Processing Unit), ROM (Read Only Memory), and RAM (Random Access Memory), provides integrated control of the operator terminal device 5 overall. A computer of various types, including, for example, personal computers, smartphones, or tablet terminals, may be used for operator terminal device 5. For example, a filter replacement worker or person in charge of filter replacement, etc. would carry the operator terminal device 5.

For example, when the operator terminal device 5 is a terminal used by a filter replacement worker, a plural number of clog estimation units 4 are registered to that operator terminal device.

The vibration detection unit 32 of the vibration data transmission unit 3 detects the angular velocity and acceleration of the filtration device 2 at predetermined detection intervals, providing such information to the controller 31. Via external interface 33, the controller 31 sends as vibration data the detected angular velocity and acceleration to the clog estimation unit 4 together with the individual ID (Identification) of the vibration data transmission unit 3.

The controller 41 of the clog estimation unit 4 uses vibration data provided via the external interface 43 to execute clog estimation processing.

More specifically, clog estimation begins when the controller 41 receives a request signal via the external interface 43 to initiative clog estimate processing in response to operation input from the user operation unit (not shown).

The controller 41 extracts the individual ID from the vibration data and identifies the vibration data transmission unit 3, and also calculates the vibration value in the direction of the z-axis using the angular velocity and acceleration extracted from the vibration data, calculating the vibration value in question as an average vibration value at each predetermined calculation interval.

In the storage unit 45 of the clog estimation unit 4 is registered the individual ID for each vibration data transmission unit 3 and corresponding filtration device 2 and information related to filtration device 2 (for example, filter model number, last replacement timing, etc.). The controller 41 calculates an average vibration value for each vibration data transmission unit 3, storing the average vibration value in question in the storage unit 45.

The controller 41 monitors average vibration value, estimating the degree of blockage. In other words, the controller 41 determines whether the average vibration value is less than the predetermined first threshold value, determining that the degree of blockage is small if the average vibration value exceeds the first threshold value.

Here, the storage unit 45 of the clog estimation unit 4 is already registered with the operator terminal device 5 of the operator. The operator terminal device 5 registered may be a single device or a plurality of devices.

In the event that the average vibration value is less than the first threshold value, the controller 41 determines that the degree of blockage has risen. The controller 41 generates replacement preparation data indicating that the degree of blockage has risen and that it is necessary to conduct filter replacement preparations, sending this together with the individual ID to the already registered operator terminal device 5.

Furthermore, the clog estimation unit 4 displays on display unit 44 a notification of current and past average vibration values, estimated degree of blockage, and the necessity to prepare for replacement, making such viewable to the administrator. It is also possible to display through the operation unit (not shown) current and past average vibration values and estimated degree of blockage only upon request by the administrator. Further, it is possible to notify the administrator by methods other than by the display.

The individual ID of each vibration data transmission unit 3 and corresponding filtration device 2 and information related to the filtration device 2 (for example, filter model number, filtration device 2 installation location, etc.) is registered in advance in the storage unit 55 of the operator terminal device 5.

The controller 51 of the operator terminal device 5 supplies notification information prompting the replacement preparation to display unit 54 and output unit 56 when replacement preparation data is supplied via external interface 53. As a result, the display unit 54 displays the need to conduct replacement preparation in combination with information related to filter model number and filtration device 2. Also, output unit 56 notifies the operator of the need for replacement preparation through, for example, vibration, Patlite (registered trademark), etc.

In this way, the operator can perform filter replacement preparation in advance. For example, the operator can prepare a filter and go to the factory in which the filtration device 2 is installed, making preparations in conjunction with the timing of filter replacement timing, avoiding the need to stop the factory in order to prepare the filter replacement, and extending operating time.

Further, the controller 41 of clog estimation unit 4 continues to monitor average vibration value, determining whether the average vibration value is lower than the predetermined second threshold value. When the average vibration value exceeds the second threshold value, the controller 41 continues to monitor average vibration value as normal.

When the average vibration value is less than the second threshold value, the degree of blockage is extremely high; therefore, the controller 41 immediately sends filter replacement information indicating the need for filter replacement and individual ID to the operator terminal device 5.

Also, the controller 41 generates notification information indicating the need for filter replacement and sends this to the display unit 44. As a result, the display unit 44 displays a notification indicating the need to immediately replace the filter.

When filter replacement data is provided via the external interface 53 the controller 51 of the operator terminal device 5 generates notification information indicating the need for filter replacement, supplying this to display unit 54 and output unit 56. As a result, the display unit 54 displays the need to conduct an immediate filter replacement in combination with information related to filter model number and filtration device 2. Also, output unit 56 notifies the operator of the need to immediately replace the filter through, for example, vibration, Patlite (registered trademark), etc.

The controller 41 of the clog estimation unit 4 continues to monitor average vibration value and continues to calculate average vibration value. Clog estimation processing is completed when the replacement signal to conduct filter replacement is supplied by the external interface 33 via user operation input in the operation unit (not shown).

In this way, filter monitoring system 1 uses the time lag between the initial rise of average vibration value and complete filter clogging to prompt the administrator and/or worker to make preparations to replace a filter. This makes it possible to reduce filtration device 2 stoppage time for filter replacement and increase factory operation rates.

Further, the filter monitoring system 1 is capable of estimating the degree of blockage using the vibration data transmission unit 3 that detects vibrations of the filtration device 2, eliminating the need for complicated installation work.

[1-2. Clog Estimation Processing Procedure]

Figure 7:
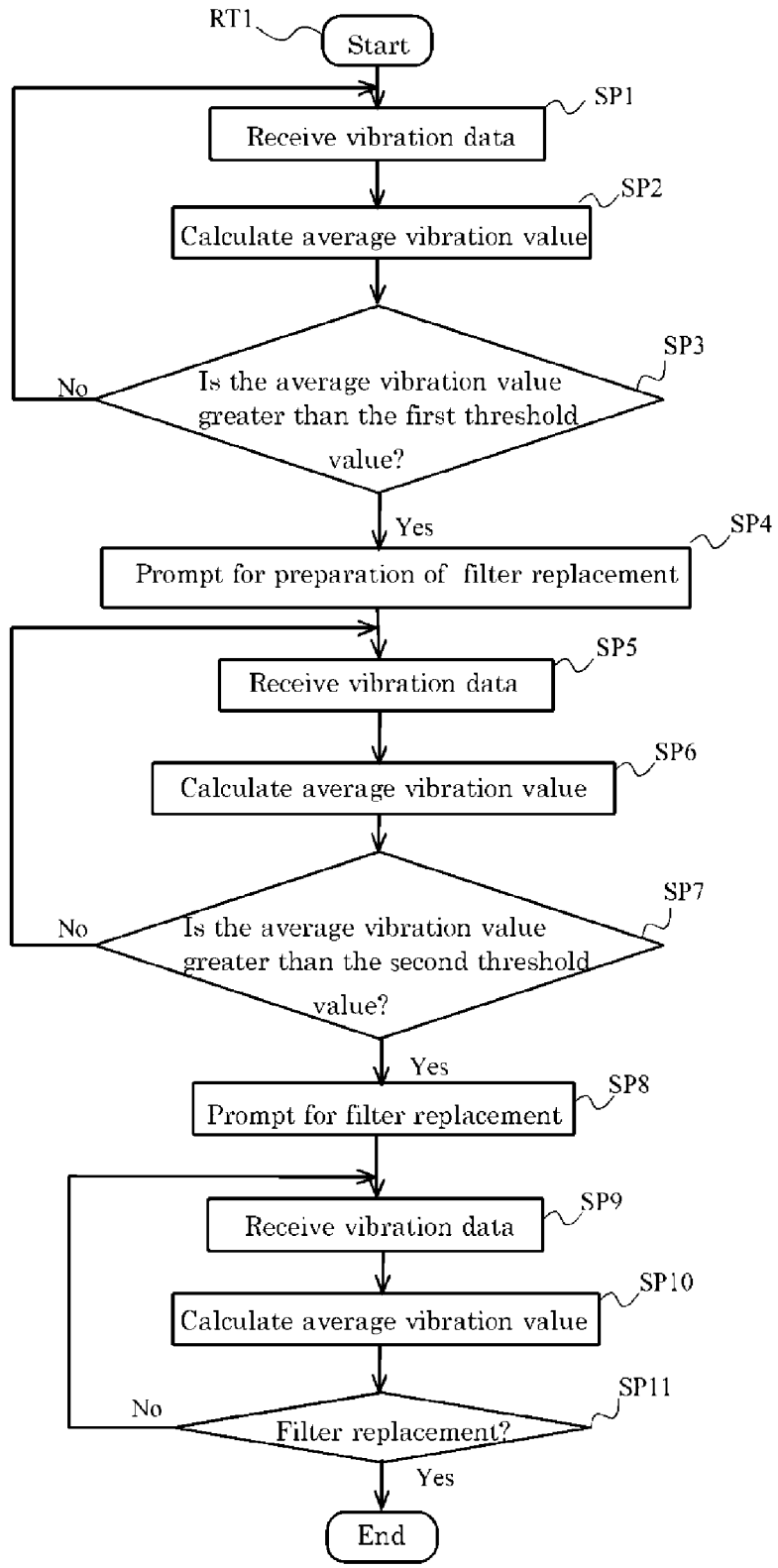
FIG. 7 This is a flow chart representing the clog estimation processing procedure.

Next, the clog estimation procedure executed by the clog estimation unit 4 in accordance with a clog estimation program will be explained using the flow chart of FIG. 7.

In response to the operation input of the administrator, a request signal to start clog estimation processing is supplied, and the clog estimation unit 4 begins clog estimation processing procedure RT1, entering the initiation step and transitioning to step SP1.

In step SP1, the clog estimation unit 4 receives vibration data supplied by the vibration data transmission unit 3, transitioning to the next step, which is step SP2.

In step SP2, clog estimation unit 4 calculates the average vibration value for the predetermined calculation interval, transitioning to the next step, which is step SP3.

In step SP3, the clog estimation unit 4 determines whether the average vibration value calculated in step SP2 exceeds the first threshold value. If a negative result is obtained here, this indicates that the degree of blockage is small and that there is a grace period until the filter is completely clogged. At this time, the clog estimation unit 4 returns to step SP1.

On the other hand, if a positive result is obtained in step SP3, this indicates that the degree of blockage is high, and, despite a certain grace period before the filter is completely clogged, the filter is nearly completely clogged. At this time, the clog estimation unit 4 transitions to the next step, which is step SP4.

In step SP4, the clog estimation unit 4 prompts the administrator and/or worker to make preparations to replace the filter, and then transitions to the next step, which is step SP5.

In step SP5, the clog estimation unit 4 receives vibration data supplied by the vibration data transmission unit 3, and transitions to the next step, which is step SP6.

In step SP6, the clog estimation unit 4 calculates the average vibration value for the predetermined calculation interval, and then transitions to the next step, which is step SP7.

In step SP7, the clog estimation unit 4 determines whether the average vibration value calculated in step SP6 exceeds the second threshold value. If a negative result is obtained here, this indicates that, although the degree of blockage is high, there is somewhat of a grace period until the filter is completely clogged. At this time, the clog estimation unit 4 returns to step SP5.

On the other hand, if a positive result is obtained in step SP7, this indicates that the degree of blockage is extremely high, and there is no grace period until the filter is completely clogged. At this time, the clog estimation unit 4 transitions to the next step, which is step SP8.

In step SP8, the clog estimation unit 4 prompts the administrator or worker to replace the filter, transitioning to the next step, which is step SP9.

In step SP9, the clog estimation unit 4 receives vibration data supplied by the vibration data transmission unit 3, and then transitions to the next step, which is step SP10.

In step SP10, the clog estimation unit 4 calculates the average vibration value for the predetermined calculation interval, and then transitions to the next step, which is step SP11.

In step SP11, the clog estimation unit 4 determines whether the filter has been replaced. If a negative result is obtained here, at this time the clog estimation unit 4 returns to step SP9.

On the other hand, if a positive result is obtained in step SP11, at this time the clog estimation unit 4 transitions to the completion step, completing clog estimation processing procedure RT1.

[1-3. Configuring the Threshold Value]

Following is a description regarding the configuration method of the first threshold value and the second threshold value mentioned above.

Vibrational direction and amplitude vary according to the type of fluid, characteristics of the pump, filter model number, housing shape, piping diameter, and any number of other factors. As a result, average vibration values will change. Accordingly, when installing a vibration data transmission unit 3 for a filter monitoring system 1, a waveform pattern for the average vibration value is first obtained for the filter used. The first threshold value and the second threshold value are then configured based on the waveform pattern in question.

More specifically, the controller 41 of the clog estimation unit 4 will display a confirmation message for conducting a threshold value configuration on display unit 44 if a request signal to initiate clog estimation processing is supplied during a state in which the first threshold value and second threshold value are not registered. The controller 41 will initiate threshold value configuration when a request signal to perform threshold value configuration is supplied via administrator operation input.

The controller 41 calculates the vibration value in the z-axis direction using angular velocity and acceleration extracted from vibration data, initiating the calculation of the average vibration value for the vibration value in question for each predetermined calculation interval, continuing to calculate average vibration value via administrator operation input until the filter is recognized as having been completely clogged.

The controller 41 uses the waveform pattern obtained to detect an inflection point at which the average vibration value rapidly decreases, determining the first threshold value as the multiplication value of the inflection point in question multiplied by a predetermined coefficient (0.8, for example).

The controller 41 determines the second threshold value as the multiplication value of the average vibration value at the time of a complete clog multiplied by a predetermined coefficient (1.2, for example).

The controller 41 registers the calculated first threshold value and second threshold value in the storage unit 45. The controller 41 can apply the first threshold value and second threshold value calculated for one filtration device 2 to a second filtration device 2 of the identical model number.

Further, if the clog estimation unit 4 is administered centrally by a common server or via the cloud, the first threshold value and second threshold value calculated for one filtration device 2 can be applied to a second filtration device 2 of the identical model number installed in a different factory or company.

Further, the clog estimation unit 4 can configure the first threshold value based on the second threshold value. For example, the clog estimation unit 4 can be configured to provide the administrator a notification prompting the preparation of a replacement filter a certain number of hours prior to the warning prompt to replace a filter. By means of the threshold value configuration, the controller 41 can configure the second threshold value, and at the same time specify an average vibration value at a certain preset number of hours and minutes prior to the notification prompt to prepare for filter replacement, establishing this as the first threshold value. In this fashion, a notification prompt to prepare for filter replacement can be provided at a predetermined time in advance of the time at which the filter is estimated to be clogged completely. In addition, this may be defined as the third threshold value, providing a second notification prompting the preparation of filter replacement.

Further, the clog estimation unit 4 may be equipped with a function to edit the first threshold value and second threshold value. In this case, the controller 41 of the clog estimation unit 4 uses the waveform pattern obtained through the clog estimation process to perform the process to determine first threshold value and second threshold value similar to the threshold value configuration process. If the configured first threshold value and second threshold value are separated by more than the separation threshold, a correction is made in the direction to reduce the portion of the separation.

Furthermore, the controller 41 of the clog estimation unit 4 allows for manual input of the configuration for the first threshold value and second threshold value when the first threshold value and second threshold value are not in a registered state.

[1-4. Other Embodiments]

The embodiment described above addressed the case using a single-axis detection type gyro sensor to detect angular velocity in the z-axis direction. The described technology is not limited to this type of gyro sensor, but may also use a two-axis or three-axis detection type gyro sensor, allowing for the combination of x-axis, y-axis, and z-axis detection data corresponding to the filtration device 2 and configuration of piping 21 and 22. Further, using a gyro sensor capable of three-axis detection and actually mounting a vibration data transmission unit 3 on the filtration device 2 allows for the generation of x-axis, y-axis, and z-axis vibration data from which the single most suitable data can be selected successively. Furthermore, a gyro sensor or acceleration sensor are not necessarily required as long as the vibration of the filtration device 2 can be detected in some way. Of course, an acceleration sensor can be used alone.

Also, the embodiment above described a case in which the vibration data transmission unit 3 sends acceleration and angular velocity data as vibration data described technology is not limited to this case, and may, for example, send vibration values from acceleration and/or angular velocity data to calculate average vibration value. An optimal distribution of processing between vibration data transmission unit 3 and clog estimation unit 4 is preferable, based on a view of the balance between communications volume and calculation volume.

Furthermore, the embodiment above described a case which uses the average vibration value as the index value. The described technology is not limited to this case, and, for example, a value obtained through a low-pass filter of the vibration value may be used as the index value. Even in this case, the same effect as the embodiment above can be obtained.

Furthermore, the embodiment above described a case in which the clog estimation unit 4 provides a notification of replacement preparation data. The described technology is not limited to this case, and the clog estimation unit 4, based on the estimated degree of blockage, may estimate the grace period until said filter is clogged, providing a notification of the grace period itself. In this case, for example, a countdown until replacement can be provided, displayed on the display unit 44 of the clog estimation unit 4 and the display unit 54 of the operator terminal device 5.

Also, the embodiment above described a case which estimates the degree of blockage of the filter based on vibrations. The described technology is not limited to this case, and, in addition to vibrations, the pressure of the filtration device 2 can be detected, estimating the degree of blockage of the filtration device 2 based on both detected vibration and pressure. In this case, for example, FIG. 1 indicates the intersection where the average vibration value and the average pressure value crosses as a singular point, which is preferable to use as the timing for preparing for filter replacement.

Furthermore, the embodiment above describes a case in which the filter monitoring system 1 consists of a vibration data transmission unit 3 mounted on a filtration device 2, a clog estimation unit 4, and an operator terminal device 5. The described technology is not limited to this case, and the operator terminal device 5 is not necessarily required.

Further, the embodiment above describes a case estimating the degree of blockage of a filter based on vibrations. The described technology is not limited to this case, and, for example, the degree of blockage of a filter can be estimated based on pressure, notifying the user with replacement preparation data to prepare for filter replacement. This case is similar to the effect of the described technology of notifying the timing to prepare for filter replacement.

Furthermore, the embodiment above describes a case in which the filter monitoring system 1, as a filter monitoring system 1, is comprised of a vibration data transmission unit 3, as a vibration data transmission unit, and a clog estimation unit 4, as a clog estimation unit. The described technology is not limited to this case, and the filter monitoring system of the described technology may be comprised of a vibration data transmission unit consisting of a variety of components and a clog estimation unit.

[1-5. Operation and Effects]

According to the configuration above, invention group A, from the aspect of estimating the degree of blockage of a filter based on vibrations, and invention group B, from the aspect of prompting the preparation of filter replacement in advance by using changes in an index value prior to complete filter clog, can be derived from filter monitoring system 1. Certain corresponding portions are shown within parentheses to show correspondence with the descriptions in the detailed description.

<Invention Group A>

The clog estimation method of the present invention estimates the degree of blockage of the filter as described above by means of detecting the phenomenon of a reduction in vibration value caused by a filter clog, based on the vibrations of a filtration device (filtration device 2) mounted on the filter.

Through this, the clog estimation method may estimate the degree of blockage based on vibrations. Since vibrations do not differ whether on the interior or exterior of the filtration device, vibrations may be detected on the exterior of the filtration device without installing a device in the filtration device internally, eliminating the need for major installation work. At this time, it is preferable that the clog estimation method detects vibrations of the housing containing the filter. Because the filter vibrations are directly conveyed to the housing, the phenomenon of vibration value decreasing due to filter clog can be detected with high precision.

The clog estimation method estimates clogs as described above from the average vibration value, which is the average value of vibrations as described above over a predetermined period of time.

Accordingly, minor fluctuations in vibration value can be excluded to obtain an improved estimation precision.

The clog estimation method estimates the recommended time to replace the filter as described above based on vibrations as described above.

Accordingly, the administrator or operator, as the user, is given a notification of filter replacement information representing the recommended timing of filter replacement.

Based on the degree of blockage described above, the clog estimation method estimates the grace period until the filter described above is clogged.

Accordingly, the clog estimation method is able to notify the administrator or operator of the timing in which the filter is estimated to be clogged.

In addition to the vibrations described above, the clog estimation method can detect the pressure of the filtration device described above, estimating the degree of blockage of the filter in the filtration device described above based on both detected vibration and pressure.

Through this, the clog estimation method is able to estimate the degree of blockage based on two different indices, obtaining a higher degree of precision for the degree of blockage.

The vibration described earlier with respect to the clog estimation method is a vibration in a singular axis.

Accordingly, the clog estimation method may improve the precision of the vibration value by reducing noise.

The filter monitoring system (filter monitoring system 1) of the described is mounted on a filtration device, comprised of a vibration data transmission unit (vibration data transmission unit 3), which detects vibrations of the filtration device described above, sending vibration data based on the vibration in question, and a clog estimation unit (clog estimation unit 4), which estimates the degree of blockage of the filter described above, based vibration data sent by the vibration data transmission unit described above.

Through this, the filter monitoring system may estimate the degree of blockage for a filter by mounting only a vibration data transmission unit easily on the filtration device.

The clog estimation unit described above estimates the recommended timing for replacing a filter as described above, notifying an administrator.

Through this, the filter monitoring system provides notification of filter replacement data to an administrator in a location distant from the filtration device regarding the recommended timing for replacing a filter.

The clog estimation unit described above estimates the recommended timing for replacing a filter as described above based on the degree of blockage as described above, notifying the operator to conduct replacement operations.

Through this, the filter monitoring system provides notification of filter replacement data to an operator in a location distant from the filtration device regarding the recommended timing for replacing a filter.

The clog estimation unit described above estimates the recommended timing to prepare for replacing a filter as described above based on the degree of blockage as described above, sending a notification.

Through this, the filter monitoring system provides notification of filter replacement preparation data to an administrator or operator in a location distant from the filtration device regarding the recommended timing for preparing to replace a filter.

The vibration data transmission unit (vibration data transmission unit 3) of the described technology is mounted on a filtration device, comprised of a vibration detection unit (vibration detection unit 32) which detects vibrations of the filtration device described above, and a transmission unit (external interface 33), which transmits vibration data based on the vibrations as described above.

Through this, the vibration data transmission unit sends vibration data representing the vibrations of a filtration device to an external clog estimation unit.

The vibration detection unit described above is comprised of an angular velocity sensor and an acceleration sensor.

Through this, the vibration detection unit removes the element of angle from acceleration, calculating vibration value in each axial direction, improving the precision of degree of blockage by reducing noise in connection with vibration value.

<Invention Group B>

The filter monitoring system (filter monitoring system 1) of the described technology is mounted to a filtration device (filtration device 2), and is comprised of an index transmission device (vibration data transmission unit 3), which detects indices (vibration, pressure, etc.) that change in correspondence to a clog in a filter of a filtration device as described above, sending index data (vibration data) based on said indices, and a clog estimation unit, which estimates the degree of blockage of a filter based on the index data described above, notifying (display, audio, vibration, Patlite (registered trademark), etc.) the user (administrator or operator) of recommended filter replacement preparation information for preparing to replace a filter based on the estimated degree of blockage.

Through this, the filter monitoring system uses the fact that the value of the index changes gradually, notifying the user before the filter becomes completely clogged. Accordingly, the user may conduct filter replacement preparations beforehand, reducing significantly the time a factory has to pause operations waiting for a filter.

The clog estimation unit described above Notifies the user described above of filter replacement information for recommended filter replacement as described above.

Through this, the user may be notified regarding appropriate timing for filter replacement, even when the user is in a distant location The user described above is a managing administrator or an operator who replaces the filter described above.

The replacement preparation data described above is notified to the user described above at a prior to the filter replacement data described above at a predetermined set time.

Through this, the user may receive a notification at a certain time required, for example, for filter preparation, allowing for the efficient, reliable preparation of a filter.

The timing for notification of filter replacement data described above for the filter monitoring system is determined according to the changes in value of the index data as described above.

Through this, the filter monitoring system detects an inflection point, establishes threshold values, and conducts other simplified processing to determine the timing for providing a notification of filter replacement data.

The index data described above is vibration data based on vibrations of the filtration device described above.

Through this, the filter monitoring system uses vibrations to estimate a clog.

The clog estimation unit described above sends at least the replacement preparation data described above and the filter replacement data described above to the operator terminal device of the operator who will conduct replacement of the filter described above.

Through this, the filter monitoring system conveys filter replacement preparation data as described above and filter replacement data as described above reliably to an operator.

The filter monitoring system is mounted to a filtration device, and is comprised of an index transmission unit, which detects changing indices corresponding to a clog of a filter in a filtration device described above and sends index data based on said indices, and a clog estimation unit, which determines the notification timing of replacement preparation data for recommended filter replacement preparation according to the first threshold value for an index value based on index data described above and determines notification timing of filter replacement data for filter replacement according to the second threshold value.

Through this, the filter monitoring system conveys filter replacement timing to the user after requiring filter preparation, improving the convenience to the user.

The clog estimation unit described above configures a second threshold value described above based on the index value described above when the filter is completely clogged.

Through this, the filter monitoring system is able to configure a second threshold value appropriately, regardless as to the filtration device 2 shape, piping, filter model number, or other factors.

The clog estimation method of the described technology is mounted to the filtration device, detecting indices that change in correspondence to a clog in a filter contained in a filtration device described above, and estimating the degree of blockage of a filter based on the index data described above. The user is notified of replacement preparation data to prepare the filter replacement based on the estimated degree of blockage.

Through this, the replacement preparation data is notified to the user prior to a filter clog, allowing the preparation of filter replacement before the fact, and saving time necessary to replace a filter after a clog occurs.

Mounted on a filtration device, detects the index that changes in correspondence to a clog in a filter of a filtration device described above, determining the timing for notification of replacement preparation data recommended for preparing a filter replacement according to the first threshold value, and determining the timing for notification of filter replacement data recommended to replace the filter according to the second threshold value.

Through this, the timing for recommended notification of replacement preparation data and filter replacement data may be determined, using the filter efficiently throughout its life, while saving time required for replacing a filter due to a clog.

<Second Embodiment>

[2-1. Reducing Miscellaneous Vibration]

Depending on factory in which the filtration device is installed or other installation locations, it is possible that vibrations ("miscellaneous vibration," below) may arise from other devices or factors other than a clog of the filter. Accordingly, the second embodiment and the third embodiment incorporate a miscellaneous vibration reduction process to reduce miscellaneous vibration from vibration value detected from a filtration device, in addition to the composition of the first embodiment.

Figure 8:
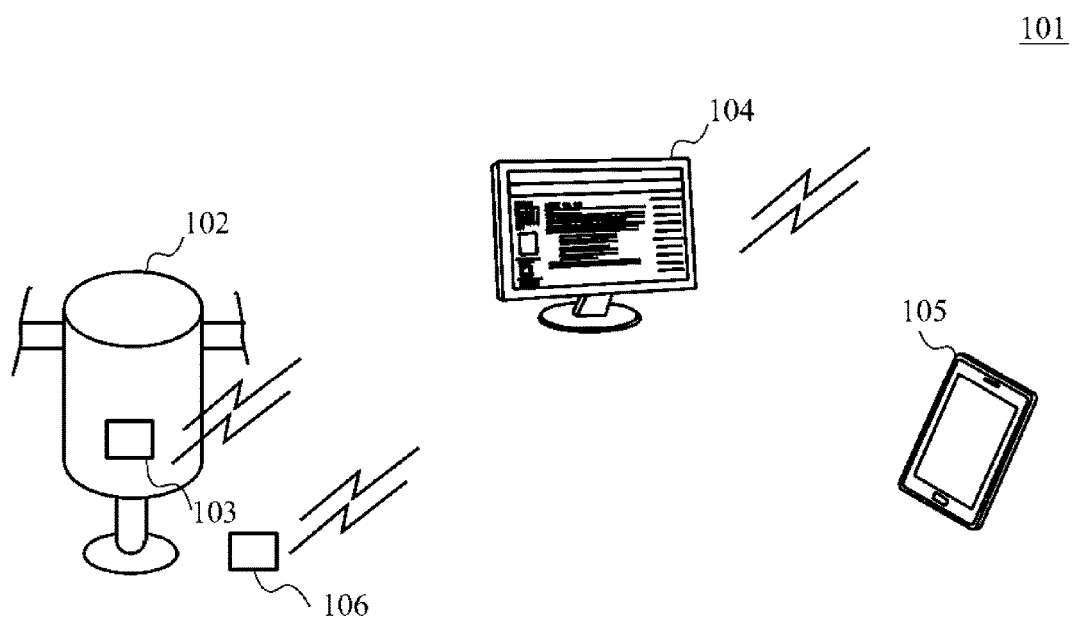
FIG. 8 This is a schematic diagram representing the configuration of the filter monitoring system under the second embodiment.

As shown in FIG. 8, the filter monitoring system 101 of the second embodiment incorporates vibration data transmission unit 103 on the filtration device, as well as sub vibration data transmission unit 106, which detects miscellaneous vibration in the area of installation. This mechanism removes miscellaneous vibration from the vibration of filtration device 2. Furthermore, this embodiment is labeled by adding 100 to the corresponding parts of the first embodiment, omitting explanations for these similar parts.

As shown in FIG. 8, sub vibration data transmission unit 106 is in the vicinity of filtration device 102, and is preferably installed in a location to the greatest extent possible where vibrations fluctuating due to a filter clog are not detected (for example, a floor or pillar in the vicinity of filtration device 102).

Sub vibration data transmission unit 106 is essentially the same configuration as vibration data transmission unit 103, and in response to operations of the controller 161, supplies vibration data ("sub vibration data," below) detected by the vibration detection unit 162 via the external interface 163 to clog estimation unit 104.

Clog estimation unit 104 removes miscellaneous vibrations from the vibration data sent from the vibration data transmission unit 103 based on sub vibration data sent from sub vibration data transmission unit 106, performing a miscellaneous vibration reduction process that reduced the effects of miscellaneous vibration to the greatest extent possible.

[2-1-1. Simple Subtraction of Miscellaneous Vibration from Vibration Data]

The clog estimation unit 104 performs a simple subtraction calculating the differential value between vibration data and sub vibration data, considering the differential value to be filter vibration originating in the vibration of the filter, more accurately detecting the reduction in vibration value arising from a clog in the filter.

More specifically, the unit ID of the vibration data transmission unit 103 and the unit ID of the sub vibration data transmission unit 106 are variously registered in the controller 141 of the clog estimation unit 104. The controller 141 identifies the vibration data and sub vibration data received from each unit ID simultaneously, calculating the vibration value in the direction of the z-axis for each based on the angular velocity and acceleration extracted from the vibration data and sub vibration data, and calculating the average vibration value and average sub vibration value of the vibration value in question for each predetermined calculation interval. Further, the controller 141 subtracts the average sub vibration value from the average vibration value, determining the differential value as the average vibration value arising from the vibration of the filter.

Through this, the clog estimation unit 104 is able to eliminate the effect of miscellaneous vibration from the value of the average vibration value, providing a greater degree of detection accuracy for vibrations arising from a clog in a filter.

Further, the controller 141 may also calculate the differential value in the direction of the z-axis based on vibration data and sub vibration data, using the average value of the differential value in question for each predetermined calculation interval as the average vibration value. Of course, as with the first embodiment, vibration other than in the z-axis or vibrations in more than two axes may be used.

Also, in the case that a plural number of vibration data transmission units 103 are installed, it is preferable that a sub vibration data transmission unit 106 is installed for each vibration data transmission unit 103, or, in other words, that one sub vibration data transmission unit 106 is installed in a pair. Through this, vibrations generated by other equipment, etc. placed in the vicinity of the installation factory can be eliminated accurately.

A single sub vibration data transmission unit 106 may be installed for a plural number of vibration data transmission unit 103. In the event that uniform miscellaneous vibrations are generated in a factory overall, the number of installed sub vibration data transmission units 106 may be reduced, reducing the costs necessary for the filter monitoring system 101.

In the case of installing one sub vibration data transmission unit 106 for a plural number of vibration data transmission units 103, it is also possible to compare the size of miscellaneous vibrations among the vibration data transmission units 103, calculating the relevant data representing the relationship related to the vibration data transmission unit 103, and eliminating the miscellaneous vibration that differs in size for each vibration data transmission unit 103.

More specifically, at the time of the first measurement (when calculating the relevant data), the same number of sub vibration data transmission units 106 are installed in pairs with a plural number of vibration data transmission units 103. The unit ID of the paired sub vibration data transmission unit 106 and vibration data transmission unit 103 are each correlated together and stored in the clog estimation unit 104.

The clog estimation unit 104 analyzes the relationship between the sub vibration data for each sub vibration data transmission unit 106, calculating the relevant data representing the relationship in question. As an example here, the relevant data may be calculated as a coefficient equivalent to the size of miscellaneous vibrations occurring at the same time for each predetermined frequency.

The coefficient calculated for each sub vibration data transmission unit 106 and the paired vibration data transmission unit 103 are correlated and stored in the clog estimation unit 104. For the second process and beyond, the filter monitoring process is performed by removing everything except one sub vibration data transmission unit 106.

At this time, the clog estimation unit 104 calculates an average sub vibration value based on the sub vibration data, multiplying by a coefficient corresponding to each vibration data transmission unit 103, and subtracting this from the average vibration value as the value of the miscellaneous vibration. Through this, even in cases where the size of the miscellaneous vibration differs according to location, simply installing one sub vibration data transmission unit 106 allows the elimination of miscellaneous vibration appropriately from each vibration data transmission unit 103, providing a more accurate detection of filter clog.

Also, it is possible to permanently install a sub vibration data transmission unit 106 for a filter monitoring system 101, constantly conducting simple subtraction processing; however, it is also possible to install a sub vibration data transmission unit 106 for the first time or at regular interval, storing the sub vibration data obtained at that time in the storage unit 145, and using the stored sub vibration data to perform the simple subtraction process. Through this, the installation cost of the sub vibration data transmission unit 106 may be reduced.

In this manner, installing a sub vibration data transmission unit 106 to detect miscellaneous vibration and subtracting miscellaneous vibration allows for the reduction of the effect of miscellaneous vibration from vibration data to accurately calculate only those vibrations originating in the filter, providing for a more accurate detection of filter clog.

[2-1-2. Reducing Miscellaneous Vibration Through Frequency Band Elimination]

The clog estimation unit 104 analyzes the frequency band of vibration for miscellaneous vibration related to sub vibration data, conducting processing to eliminate the frequency band from the vibration data of the frequency band for which the miscellaneous vibration is large.

More specifically, the controller 141 of the clog estimation unit 104 calculates the vibration value from vibration data and sub vibration data, analyzing the frequency band for the vibration value in question. While the controller 141 compares the size of vibration value for each predetermined frequency band which are not large compared to the vibration data, it identifies the frequency band representing the large vibration value in the sub vibration data as the frequency band of the miscellaneous vibration. The controller 141 calculates average vibration value after having eliminated the miscellaneous vibration frequency band from the vibration value of the vibration data.

Through this, the clog estimation unit 104 is able to reduce miscellaneous vibration, providing greater accuracy in detecting a filter clog.

Furthermore, a single sub vibration data transmission unit 106 may be installed for a plural number of vibration data transmission units 103 for frequency band elimination processing. Also, the clog estimation unit 104 has two modes, allowing for a switch between simple subtraction processing and frequency band elimination processing. For example, if the controller 141 calculates the vibration value from the vibration data and sub vibration data, analyzing the frequency band and finding that the miscellaneous vibration and the filter vibration overlap in the same frequency band, it performs a simple subtraction process. If it finds that the miscellaneous vibration and filter vibration do not overlap in the same frequency band, it is able to perform a frequency band elimination process.

Also, during the first process (between filter replacement and the next clog), the vibration data and sub vibration data can be obtained throughout, allowing for the identification of the vibration frequency arising from a clog in the filter.

In this case, controller 141 of the clog estimation unit 104 calculates the vibration value arising from the filter vibration by eliminating the miscellaneous vibration through simple subtraction, identifying the relevant frequency band. For the second and following processes, the controller 141 cuts out vibrations other than those of the identified frequency band, using only the vibration value of the identified frequency band to calculate the average vibration value. Through this, the installation of a sub vibration data transmission unit 106 can be limited to one process, allowing the installation cost of the sub vibration data transmission unit 106 to be reduced.

Also, the controller 141 can analyze the details of the vibration in the vibration data, efficiently reducing only the miscellaneous vibration using the frequency pattern, etc. The analysis method, for example, may consist of monitoring the vibration value for each frequency band across a predetermined range during the first processing, identifying the frequency band of the vibration that reduces simultaneously with the filter clog as the vibration arising from filter vibration.

Also, the operation state and vibration of the filtration device 102 may be monitored constantly, allowing for the frequency band of the vibration expressed in a stable state during filtration device operation to be identified as vibration arising from filter vibration. In other words, the filtration device may be arbitrarily operated and stopped to identify the frequency band of the vibration expressed during operation and of the vibration expressed during non-operation to identify the frequency band expressed during operation only as the vibration arising from filter vibration.

For example, the vibration data transmission unit 103 measures vibration data for a certain period of time (for example, even a short period of a few seconds to a few minutes is possible, as is a long period of several hours) immediately following the replacement of a filter in the filtration device 102. At this time, the clog estimation unit 104 is set to non-operation through manual input or through a link with the managing device that controls the filtration device 102. The miscellaneous vibration data measured is stored in the storage unit 145 of the controller 141 of the clog estimation unit 104. As filtration device 102 is operated, the controller 141 calculates the average vibration value after having reduced the miscellaneous vibration from the vibration data supplied. Furthermore, the reduction of miscellaneous vibration is performed by eliminating or reducing the frequency band of the identified miscellaneous vibration data, by the miscellaneous vibration data itself, or by multiplying by a coefficient to produce a differential value.

A more detailed vibration pattern may be analyzed otherwise by applying a frequency analyses using a time-frequency plane (patent application no. 2011-189187) or nonnegative matrix factorization (NMF) (Journal of the Institute of Electronics, Information and Communication Engineers, Vol. 95, No. 9, 2012), etc. In this case, vibration data is analyzed directly, eliminating the need for the installation of sub vibration data transmission unit 106.

Through this, the clog estimation unit 104 is able to reduce the miscellaneous vibration from the vibration data based on miscellaneous vibration detected via sub vibration data transmission unit 106, detecting a filter clog with greater accuracy.

Also, the clog estimation unit 104 is able to eliminate miscellaneous vibration other than filter vibration effectively by identifying filter vibration frequency band, vibration pattern, and other filter characteristics, detecting a filter clog with greater accuracy.

<Third Embodiment>

[3-1. Utilization of Mega Data]

Figure 9:
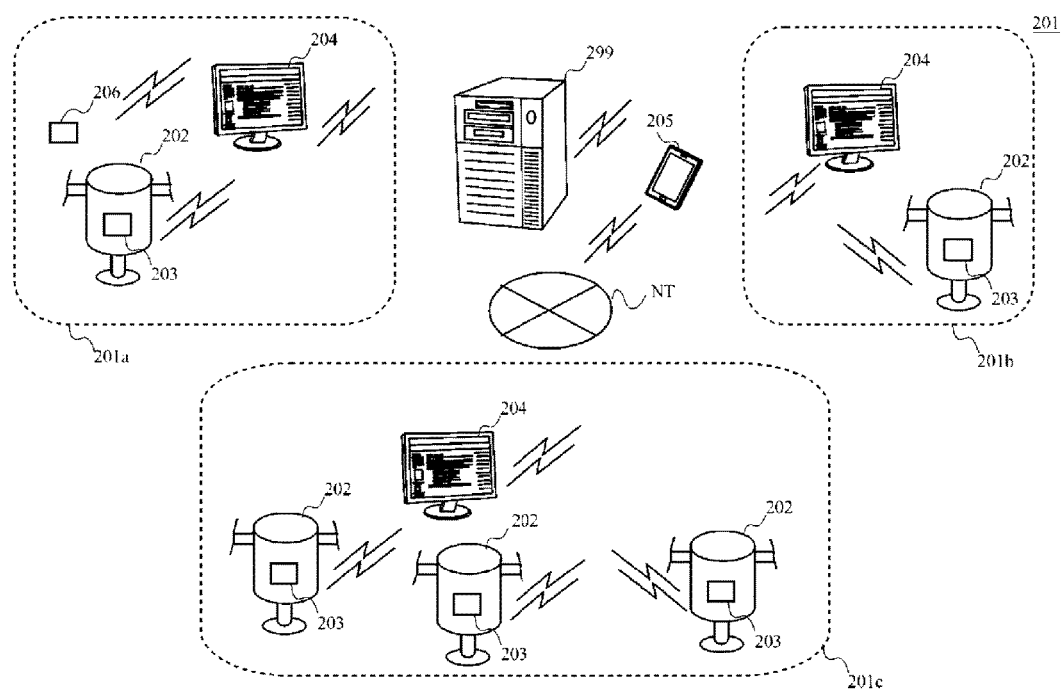
FIG. 9 This is a schematic diagram representing the configuration of the filter monitoring system under the third embodiment.
Figure 10:
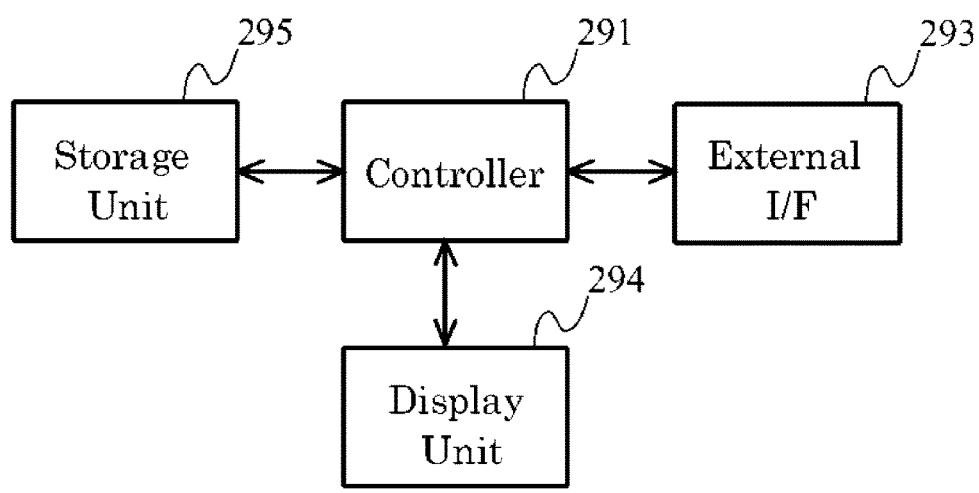
FIG. 10 This is a block diagram representing the configuration of the server.

As shown in FIGS. 9 and 10, the filter monitoring management system 201 of the third embodiment is different from the first embodiment in that server 299 controls a plural number of filter monitoring management systems 201*a* to 201*c*. Furthermore, this embodiment is labeled by adding 200 to the corresponding parts of the first embodiment, omitting explanations for these similar parts.

Filter monitoring management system 201 is comprised of a plural number of filter monitoring management systems 201*a* to 201*c*. Filter monitoring systems 201*a* to 201*c* are, for example, assembled on a factory unit basis, sending and receiving information with respect to each filter monitoring system 201*a* to 201*c* between and among clog estimation unit 294, server 299, and operator terminal device 205.

As shown in FIG. 10, the clog estimation unit 4 has a controller 291, comprised of CPU (Central processing unit), ROM (Read-only memory), and RAM (Random access memory), which provides integrated control of the server 299 overall, executing clog estimation processing as described below. The server 299 is installed at a management company managing, for example, the filter monitoring management system 201.

In the storage unit 295 of the server 299 is stored an administrative database including the ID and installation location (factory address, location within the factory, and specific installation location) of the vibration data transmission unit 203 and sub vibration data transmission unit 206 for each filter monitoring system 201*a* to 201*c*, as well as filter model number, filter replacement date, etc.

The filter monitoring management system 201 of this embodiment shares the characteristics of filter vibration via the server 299.

For example, a sub vibration data transmission unit 206 is installed in the filter monitoring system 201*a*, and the frequency band of the vibration arising from filter vibration utilizing sub vibration data, characteristics of the filter vibration, and other information ("filter property data," below) is analyzed, with this filter property data being registered in the server 299.

When new filter monitoring system 201*b* is registered, the controller 291 of the server 299 determines whether the identical filter model number is registered, sing the registered filter model number. In the case that it is registered, and in the case that the identical filter model number is registered, the corresponding filter property data is read and sent to the clog estimation unit 204 of the filter monitoring system 201b.

The clog estimation unit 204 of the filter monitoring system 201b reduces miscellaneous vibration in the vibration data utilizing the sent filter property data, calculating the average vibration value. In this manner, the clog estimation unit 204 is able to utilize filter property data identified in the other filter monitoring system 201a to reduce miscellaneous vibration from the vibration data appropriately from the initial operation. Furthermore, in the case that an identical filter model number is not registered, the clog estimation unit 204 requests a measurement of the miscellaneous vibration from the user while, for example, filtration device 202 is not in operation, or conducting processing to identify filter property data during the initial process.

At this time, server 299 monitors vibration data being supplied as needed, properly updating filter property data. For example, in the case that filter property data has been newly analyzed, and in the case that the differential value with the registered filter property data is larger than a certain amount, the filter property data will be updated. Through this, server 299 is able to reduce the effect of differences in each manufacturing lot, etc., reducing miscellaneous vibration from the vibration data in a more appropriate way.

Furthermore, the server 299 of the filter monitoring management system 201 may also conduct clog estimation processing. In this case, the clog estimation unit 204 operates as a communications device to relay vibration data sent from the vibration data transmission unit 203 without processing to the server 299.

In this manner, the filter monitoring management system 201 shares filter property data applied to other filter monitoring management systems 201a to 201c without the need to obtain filter property data for each filter monitoring management system 201a to 201c.

[4. Operation and Effects]

According to the configuration above, invention group C, from the aspect of increasing the precision of vibration data based on miscellaneous vibration, and invention group D, from the aspect of utilizing filter property data to reduce miscellaneous vibration, can be derived from filter monitoring system 101. Certain corresponding portions are shown within parentheses to show correspondence with the descriptions in the detailed description.

<Invention Group C>

The filter monitoring system (filter monitoring system 101) of the described technology is mounted on a filtration device (filtration device 102), and is comprised of a vibration data transmission unit (vibration data transmission unit 103), which detects filter vibrations in connection with the operation of a filtration device described above, and a clog estimation unit (clog estimation unit 104), which reduces miscellaneous vibrations arising from other than filter vibrations described above from vibration data described above and estimates filter clogs based on vibration values from vibration data reduced from miscellaneous vibrations described above.

Through this, the filter monitoring system is able to remove miscellaneous vibration from vibration data, allowing for higher detection precision of clogs in filters.

Further, the filter monitoring system is installed in a location with limited vibrational impact on the filter described above, and is equipped with a sub vibration data transmission unit (sub vibration data transmission unit 106), which transmits sub vibration data based on miscellaneous vibration, being vibrations other than vibrations in connection with the filter.

The clog estimation unit described above reduces miscellaneous vibration from vibration data based on vibration data described above and sub vibration data described above, estimating the degree of blockage of a filter.

Further, the phrase "location with limited vibrational impact on the filter" described above means a location within the factory or facilities in which the vibration data transmission unit 103 is installed, having the least effect possible on filter vibrations, preferably on the floor or a pillar in the vicinity of vibration data transmission unit 103 (within a range of a five to six meter radius) on equipment, etc. that will not generate vibrations.

Through this, the filter monitoring system is able to remove the impact of miscellaneous vibration from vibration data based on sub vibration data, allowing for higher detection precision of clogs in filters.

Also, the clog estimation unit described above with reference to the filter monitoring system reduces miscellaneous vibration described above from vibration data described above by subtracting sub vibration data described above from vibration data described above.

Through this, miscellaneous vibration can be reduced in real time, allowing for the reduction of miscellaneous vibration from vibration data appropriately, even in environments in which miscellaneous vibration occurs randomly due to various causes and frequencies.

Further, the previously mentioned sub vibration data transmission unit with reference to the filter monitoring system can be installed one-to-one with vibration data transmission units described above.

Through this, miscellaneous vibration may be removed in conjunction with the vibration data transmission unit, allowing for the precise reduction of miscellaneous vibration.

Also, the previously mentioned sub vibration data transmission unit can be installed one-to-many with a plurality of vibration data transmission units described above.

Through this, the filter monitoring system can have a single sub vibration data transmission unit installed, allowing for the reduction of installation costs for sub vibration data transmission units.

Further, the clog estimation unit described above for the filter monitoring system, calculates the relevant data representing the relationship of miscellaneous vibrations among sub vibration data transmission units described above using sub vibration data detected through a plural number of sub vibration transmission units described above installed in correspondence with a plural number of vibration data transmission units described above during the calculation process of relevant data, reducing, during the next and following processes, miscellaneous vibration described above for vibration data from a plural number of vibration data transmission units described above based on a coefficient described above for sub vibration data detected via a sub vibration data transmission unit installed as a single unit only in correspondence to a previously described plural number of vibration data transmission units described above.

Further, processing relevant data calculations, for example, occurs with the initial installation of a sub vibration data transmission unit or when recalculating relevant data, etc. The term "relevant data" means relevant formulas, coefficients, constants, etc., used in the calculation for each frequency band of a predetermined scope and overall for sub vibration data detected by a single sub vibration data transmission unit remaining installed. This relevant data may be a fixed value used constantly, or may be a value configured for each time of the day. In the event that there is a variation in the size of miscellaneous vibrations due to the operation of equipment in a factory at different times of the day, it will be effective to configure for each time of the day.

Through this, the size of miscellaneous vibration that varies according to installation location may be corrected for the filter monitoring system, reducing the installation cost of sub vibration data transmission units, while at the same time allowing for the appropriate reduction of miscellaneous vibration from vibration data.

Also, with respect to the filter monitoring system, the previously mentioned clog estimate unit stores miscellaneous vibration data detected during non-operating time of the filtration device described above, reducing miscellaneous vibration from the vibration data described above, based on miscellaneous vibration data described above.

Furthermore, "non-operating time of the filtration device" means, for example, times when the filtration device is stopped for filter replacement, or when the factory is stopped. In the event that the factory is not operated on a 24-hour basis, or when the occurrence of miscellaneous vibration is not related to the operation of the filtration device, etc., it will be effective to detect miscellaneous vibration data when the filtration device is stopped or during regularly scheduled times. Also, it may be effective to detect miscellaneous vibration during regularly scheduled times, stopping the operation of the filtration device temporarily for a short period of time.

Through this, a sub vibration data transmission unit does not have to be installed in the filter monitoring system, reducing installation costs, while at the same reducing miscellaneous vibration.

Also, under the clog estimation method of the described technology is mounted to the filtration device, detecting filter vibrations in connection with the operation of the filtration device described above, reducing miscellaneous vibration arising from vibrations other than the filter vibration described above and estimating the degree of filter blockage from the vibration value.

Through this, the clog estimation method is able to reduce miscellaneous vibration from vibration data, allowing for higher detection precision of clogs in filters.

Further, the clog estimation method is installed in a location with limited vibrational impact on the filter described above, and detects sub vibration data based on miscellaneous vibrations which are vibrations other than for the filter in question, reducing miscellaneous vibration described above from vibration data described above based on vibration data described above and sub vibration data described above to estimate the degree of filter blockage using vibration value from vibration data for which the miscellaneous vibration described above has been reduced.

Through this, the clog estimation method is able to reduce miscellaneous vibration from vibration data based on sub vibration data, allowing for higher detection precision of clogs in filters.

<Invention Group D>

The clog estimation unit in the filter monitoring system of the described technology identifies filter property data representing characteristics related to vibration of the filter described above from within vibrations described above detected through the vibration data transmission unit described above.

Furthermore, "filter property data" includes the vibration frequency band of the filter, the vibration pattern, and other characteristics, as well as the frequency band of vibrations not associated with the filter (regarded as miscellaneous vibration) and vibration patterns, etc. not associated with the filter.

Through this, the filter monitoring system is able to reduce miscellaneous vibration based on filter property data extracted for each filter, allowing for higher detection precision of clogs in filters, even when miscellaneous vibration data is not necessarily available in real time.

Also, with respect to the filter monitoring system, the previously mentioned clog estimate unit reduces miscellaneous vibration descried above from vibration data described above based on vibration data detected during operation and non-operation of the filtration device described above.

Through this, the filter monitoring system does not need the installation of a separate device to extract filter property data, reducing installation costs.

Also, with respect to the filter monitoring system, the previously mentioned clog estimate unit analyzes the vibration pattern for vibration data described above for each frequency over a predetermined range, using the vibration of the frequency band declining in correspondence with filter clogs as filter property data, estimating the degree of blockage for a filter using the identified frequency band vibration data.

Through this, the filter monitoring system is able to accurately identify the frequency band vibration declining in correspondence with a filter clog during the initial process, allowing for higher precision in identifying filter property data. Also, the clog estimation unit (clog estimation unit 204) described above for the filter monitoring system (filter monitoring management system 201) has a further server unit (server 299) managing a plural number of filter monitoring systems (filter monitoring systems 201*a* to 201*c*), using the filter property data supplied by the server unit described above to reduce miscellaneous vibration described above from vibration data described above.

Through this, the filter monitoring system is able to share filter property data among clog estimation units, reducing total costs by reducing the frequency of identifying filter property data.

Further, the clog estimation method estimates the degree of blockage of a filter using the vibration value for vibration data for which miscellaneous vibration described above has been reduced by identifying filter property data representing characteristics related to filter vibration described above from miscellaneous vibration data extracted via the vibration data transmission unit described above.

Through this, the clog estimation method is able to reduce miscellaneous vibration based on filter property data extracted for each filter, allowing for higher detection precision of clogs in filters, even when miscellaneous vibration data is not necessarily available in real time.

Furthermore, an appropriate combination of the structures of embodiments one through three above may be used.

INDUSTRIAL APPLICABILITY

The described technology is suitable, for example, for application in filtration devices used in the filtration of drinking water, juices, oil, and other varieties of fluids (particularly liquids).

EXPLANATION OF REFERENCES

1: Filter monitoring system
1, 101: Filter monitoring system 2, 102, 202: Filtration device
3, 103, 203: Vibration data transmission unit
4, 104, 204: Clog estimation unit
5, 105, 205: Operator terminal device
21: Piping
31: Controller
32: Vibration detection unit
33: External interface
41, 141, 41: Controller
43: External interface
44: Display unit
45, 145, 245: Storage unit
51: Controller
53: External interface
54: Display unit
55: Storage unit
56: Output unit
106, 206: Sub vibration data transmission unit
161: Controller
162: Vibration detection unit
163: External interface
201: Filter monitoring management system
201a to 201c: Filter monitoring system
291: Controller
294: Estimation unit
295: Storage unit
299: Server

What is claimed is:

1. A clog estimation method comprising:
   detecting vibration of a filtration device comprising a filter, the filtration device configured to receive fluid from a first pipe, filter the fluid by the filter, and discharge the fluid to a second pipe; and
   estimating a degree of clogging of the filter by detecting a phenomenon of reduction in a vibration value caused by a filter clog based at least in part on the vibration of the filtration device.

2. The clog estimation method of claim 1 further comprising:
   reducing noise vibration from vibration data of the filtration device; and
   estimating the degree of clogging of the filter using the vibration value of the vibration data after reducing the noise vibration from the vibration data.

3. The clog estimation method of claim 2 further comprising:
   detecting second vibration data of the filtration device, an effect of the vibration of the filtration device on the second vibration data is less than the effect of the vibration of the filtration device on the vibration data of the filtration device;
   reducing the noise vibration from vibration data of the filtration device based at least in part on the second vibration data; and
   estimating the degree of clogging of the filter using the vibration value of vibration data after reducing the noise vibration from the vibration data.

4. The clog estimation method of claim 2 further comprising:
   identifying filter property data representing characteristics related to the vibration of the filtration device from the vibration data of the filtration device transmitted by a transmitter;
   estimating the degree of clogging of the filter using the vibration value of the vibration data using the filter property after reducing the noise vibration from the vibration data.

5. A filter monitoring system comprising:
   a vibration data transmission unit mounted to a filtration device, the filtration device configured to receive fluid from a first pipe, filter the fluid by a filter included in the filtration device, and discharge the fluid to a second pipe, the vibration data transmission unit detects vibration data comprising vibration of the filter caused during operation of the filtration device and transmits the vibration data, and
   a clog estimation unit, which estimates the degree of clogging of the filter by detecting a phenomenon of reduction in a vibration value caused by a filter clog in a filter.

6. The filter monitoring system of claim 5 further comprising:
   a second clog estimation unit installed at a location of the filtration device such that a vibrational impact caused by the filter on the second clog estimation unit is less than the vibrational impact on the clog estimation unit,
   wherein the second clog estimation unit detects second vibration data comprising noise vibration and transmits the second vibration data,
   the clog estimation unit reduces the noise vibration from the vibration data based at least in part on the vibration data and the second vibration data, estimate, and estimates the degree of clogging of the filter based at least in part on the vibration data with reduced noise vibration.

7. The filter monitoring system of claim 6 wherein the clog estimation unit reduces the noise vibration from vibration data by subtracting the second vibration data from vibration data described above.

8. The filter monitoring system of claim 6 wherein a number of the second vibration data transmission unit equals to a number of the vibration data transmission unit.

9. The filter monitoring system of claim 6 wherein a number of the vibration data transmission unit is greater than a number of the second vibration data transmission unit.

10. The filter monitoring system of claim 6 wherein the clog estimation unit:
    Calculates, at during a filtration process, relationship data representing the relationship between a plurality of noise vibration of a respective plurality of second vibration data transmission units using a plurality of vibration data detected by the plurality of second vibration transmission units, and
    reduces, during a later filtration process, the noise vibration of the plurality of vibration data of the plurality of vibration data transmission units based at least in part on the relationship data and the second vibration data of one second vibration data transmission unit installed corresponding to the plurality of vibration data transmission units.

11. The filter monitoring system of claim 5 wherein the clog estimation unit stores noise vibration data detected during non-operation time of the filtration device, and reduces noise vibration from the vibration data, based at least in part on the noise vibration data.

12. The filter monitoring system of claim 5 wherein the clog estimation unit reduces noise vibration from the vibration data based at least part on filter property data representing characteristics related to the filter vibration, the filter property data is identified from vibration data.

13. The filter monitoring system of claim 5 wherein the clog estimation unit reduces noise vibration from the vibration data based at least in part on comparison between the vibration data detected during the operation and non-operation of the filtration device.

14. The filter monitoring system of claim 12 further comprising a clog estimation unit identifies the filter property data by analyzing vibration patterns for a plurality of frequency ranges of the vibration data, the filter property data comprises a frequency range of the plurality of frequency ranges, the vibration value decreases in the frequency range as the filter clogs, and estimates the degree of clogging of the filter using the vibration value of the frequency range.

15. The filter monitoring system of claim 5 further comprising a server unit controlling the filter monitoring system, wherein the clog estimation unit reduces noise vibration from the vibration data using filter property data supplied by the server unit.

16. The filter monitoring system of claim 7 wherein a number of the second vibration data transmission unit equals to a number of the vibration data transmission unit.

17. The filter monitoring system of claim 7 wherein a number of the vibration data transmission unit is greater than a number of the second vibration data transmission unit.

18. The filter monitoring system of claim 12 wherein the clog estimation unit reduces noise vibration from the vibration data based at least in part on comparison between the vibration data detected during the operation and non-operation of the filtration device.

19. The clog estimation method of claim 1 wherein the filtration device is disposed in a housing, and the detecting the vibration of the filtration device comprises detecting vibration of the housing.

20. The clog estimation method of claim 1 wherein the fluid comprises liquid.

21. The clog estimation method of claim 1 further comprising estimating a time for replacing the filter based at least in part on the vibration value and a threshold value.

22. The clog estimation method of claim 1 wherein the vibration of the filtration device is at least one of x-axis vibration, y-axis vibration, or z-axis vibration.

23. The clog estimation method of claim 1 further comprising:
  detecting pressure in the filtration device, wherein the vibration value decreases as a pressure value of the pressure increases as the filter clogs; and
  estimating the degree of the clogging of the filter based at least in part on the vibration value and the pressure value.

24. The filter monitoring system of claim 5 wherein the clog estimation unit determines a pattern of change in the vibration value and detects the phenomenon of reduction in the vibration value based at least in part on the pattern.

25. The filter monitoring system of claim 5 wherein the clog estimation unit set a threshold value when the filter is installed to the filtration device, and identifies reduction in the vibration value when the vibration value is below the threshold value.

26. The filter monitoring system of claim 5 wherein the clog estimation unit notifies a user a time for preparing to replace the filter and a time for replacing the filter based at least in part on the degree of clogging of the filter.

27. The filter monitoring system of claim 5 wherein the vibration data transmission unit comprises a vibration detector attached to an outer periphery of the filtration device and a transmitter, the vibration detector configured to detect the vibration data, and the transmitter configured to transmit the vibration data.

* * * * *